United States Patent [19]
Golstein et al.

[11] Patent Number: 5,404,171
[45] Date of Patent: Apr. 4, 1995

[54] METHOD AND APPARATUS FOR SYNCHRONIZING DIGITAL PACKETS OF INFORMATION TO AN ARBITRARY RATE

[75] Inventors: Judith A. Golstein, Browns Mills; H. Kenneth Mills, Plainsboro, both of N.J.; Michael J. Keith, Holland; James J. Jeffers, Yardley, both of Pa.

[73] Assignee: Intel Corporation, Santa Clara, Calif.

[21] Appl. No.: 901,433

[22] Filed: Jun. 19, 1992

[51] Int. Cl.⁶ .............................................. H04N 7/01
[52] U.S. Cl. .................................. 348/459; 348/441; 348/555
[58] Field of Search .............. 348/554, 555, 559, 578, 348/579, 385, 24, 22, 441, 459; H04N 7/13, 7/01, 7/00

[56] References Cited

U.S. PATENT DOCUMENTS

| | | | |
|---|---|---|---|
| 3,860,745 | 1/1975 | Takada | 348/559 |
| 4,080,626 | 3/1978 | Hurst et al. | 348/559 |
| 5,041,909 | 8/1991 | Okano | 348/385 |

FOREIGN PATENT DOCUMENTS

0317081 12/1989 Japan .............................. H04N 7/01

OTHER PUBLICATIONS

"NHK" technical disclosure, Present Status of Still-Picture Television NKH Technical Research Laboratories May 1978.

*Primary Examiner*—James J. Groody
*Assistant Examiner*—David E. Harvey
*Attorney, Agent, or Firm*—William H. Murray; Daniel H. Golub

[57] ABSTRACT

A method and apparatus for synchronizing sequence of digital information packets is disclosed. The sequence of digital information packets is provided from a digital information source at a source rate and is later received by a device having an associated synchronization rate. In a preferred embodiment, a counter increment is determined, and a current information packet and a next information packet are selected from the sequence. The current information packet is received into the device. Upon an occurrence of a synchronization event on the device, the counter increment is subtracted from a counter and the counter is compared to a predetermined threshold. If the counter is less than or equal to the predetermined threshold, then the next information packet is received into the device, a next information packet is selected from the sequence, and a predetermined constant is added to the counter.

6 Claims, 4 Drawing Sheets

METHOD AND APPARATUS FOR SYNCHRONIZING DIGITAL PACKETS OF INFORMATION TO AN ARBITRARY RATE

FIELD OF THE INVENTION

This invention relates to digital signal processing generally and particularly to systems for synchronizing sequences of digital frames representative of audio and video signals.

BACKGROUND OF THE INVENTION

Sources of digital information typically provide such information in discrete bundles or packets. For example, both digital video and digital audio information are typically supplied in frames. The rate at which packets of digital information are provided from a source typically varies depending on the synchronization rate of the source. For example, digital video provided from a source in accordance with the NTSC system will have a frame rate of 29.97 frames per second ("FPS"); digital video provided from a source in accordance with the PAL system will have a frame rate of 25.00 FPS; and digital video provided from a source in accordance with the movie format will have a frame rate of 24.00 FPS.

The rate at which packets of digital information are received or output typically varies depending on the synchronization rate of the device receiving or outputting the information. For example, the rate at which frames are displayed by a physical monitor varies depending on the synchronization rate of the monitor itself. Thus, an NTSC monitor will function at 29.97 FPS; a PAL monitor will function 25.00 FPS; a VGA monitor will function at 59.94 FPS; and a XGA monitor will function at 43.48 FPS.

In digital systems, a synchronization problem arises when the rate at which information packets are provided from a digital source differs from the rate of the device used to receive such information packets. Thus, in digital video systems, a synchronization problem arises when the rate at which frames are provided from a digital video source differs from the frame rate of the monitor used to display such frames. A similar synchronization problem arises in digital audio systems when the rate at which audio frames are provided from a source differs from the audio frame rate of the device used to play such audio.

It is an object of the present invention to provide a system for receiving or outputting packets of digital information at a rate which differs from the synchronization rate of the device being used to receive or output such information packets.

It is a further object of the present invention to provide a system for displaying digital video frames at a frame rate which differs from that of the monitor being used to display such frames.

It is a still further object of the present invention to provide a system for playing digital audio frames at a frame rate which differs from that of the audio player being used to play such frames.

It is a still further object of the present invention to provide a system for receiving or outputting digital information packets at an arbitrary user requested speed regardless of the synchronization rate of the device being used to receive or output such information packets.

It is a still further object of the present invention to provide a system for displaying digital video frames at an arbitrary user requested speed regardless of the frame rate of the monitor being used.

It is a still further object of the present invention to provide a system for playing digital audio frames at an arbitrary user requested speed regardless of the frame rate of the audio player being used.

Further objects and advantages of the invention will become apparent from the description of the invention which follows.

SUMMARY OF THE INVENTION

A method and apparatus for synchronizing a sequence of digital information packets is disclosed. The sequence of digital information packets is provided from a digital information source at a source rate and is later received by a device having an associated synchronization rate. In a preferred embodiment, a counter increment is determined, and a current information packet and a next information packet are selected from the sequence. The current information packet is received into the device. Upon an occurrence of a synchronization event on the device, the counter increment is subtracted from a counter and the counter is compared to a predetermined threshold. If the counter is less than or equal to the predetermined threshold, then the next information packet is received into the device, a next information packet is selected from the sequence, and a predetermined constant is added to the counter.

A method and apparatus for synchronizing a sequence of digital video frames is also disclosed. The sequence of digital video frames is provided from a digital video source at a source frame rate and is later displayed on a monitor having an associated vertical blanking interval rate. In a preferred embodiment, a counter increment is determined, and a current frame for display and a next frame for display are selected from the sequence of digital video frames. The current frame selected is displayed on the monitor. Upon an occurrence of a vertical blanking interval on the monitor, the counter increment is subtracted from a counter and the counter is then compared to a predetermined threshold. If the counter is less than or equal to the predetermined threshold, then the next frame is displayed on the monitor by setting the current frame equal to the next frame, a next frame is selected from the sequence for display, and a predetermined constant is added to the counter. If the counter is not less than or equal to the predetermined threshold, then the current frame is redisplayed on the monitor.

A method and apparatus for synchronizing a sequence of digital audio frames is also disclosed. The sequence of audio frames is provided from a digital audio source and is associated with a corresponding sequence of digital video frames. The corresponding sequence of digital video frames is provided from a digital video source at a source frame rate and is displayed on a monitor having an associated vertical blanking interval rate. In a preferred embodiment, first and second counter increments are determined and a determination is made whether the end of a current digital audio frame has been reached. If the end of the current frame has been reached, then a next frame from the sequence of digital audio frames is selected as the current frame and a first counter is incremented by a predetermined constant. A pair of samples from the current frame is moved to an output buffer and a determination is made whether a vertical blanking interval has occurred on the monitor. If the vertical blanking interval has occurred, the first counter increment is subtracted from the first counter and the first counter is compared to a first predetermined threshold. If the first counter is less than or equal to the first predetermined threshold, then the second counter is compared to a second predetermined threshold; otherwise the second counter is incremented by the second counter increment. If the second counter is greater than the second predetermined threshold, then the second counter is decremented by the second counter increment. At least one pair of digital audio samples is selectively duplicated in accordance with the second counter.

DETAILED DESCRIPTION OF THE PREFERRED EMBODIMENT

Figure 1:
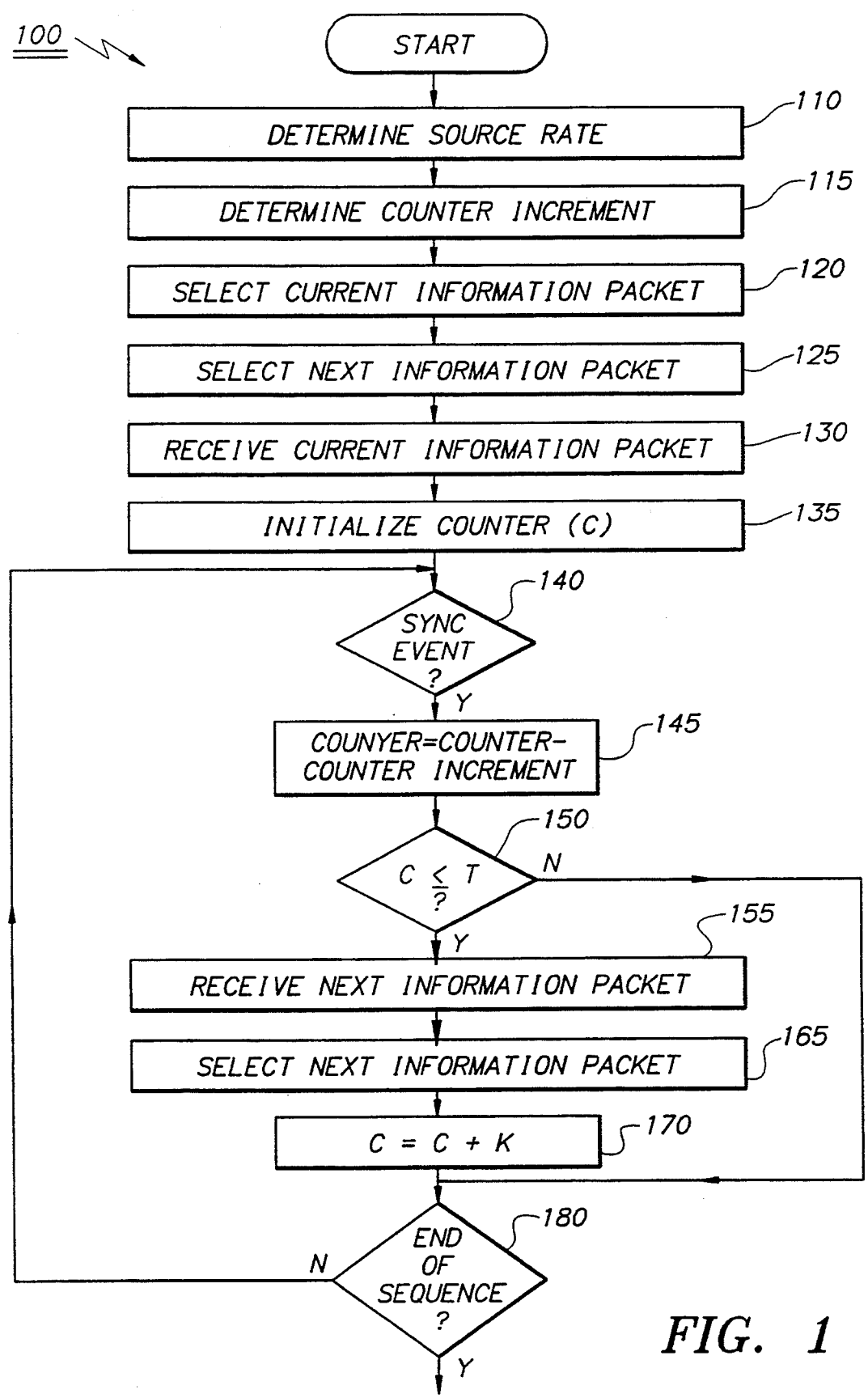
FIG. 1 is a flow diagram illustrating the operation of a system for synchronizing a sequence of digital information packets according to a preferred embodiment of the present invention.

Referring now to FIG. 1, there is shown a flow diagram illustrating the operation of a system 100 for synchronizing a sequence of two or more digital information packets that are provided from a digital information source (not shown) and later received by a receiving device (not shown). The digital information packets may be frames of digital video information, frames of digital audio information, one or more samples of digital audio information, or other bundles of digital information. The digital information source may be a digital video source, a digital audio source, or some other source that provides digital information in discrete bundles. The receiving device may be a display monitor, an audio player, or any other device capable of receiving digital information in discrete bundles.

Means 110 are provided for determining a source rate associated with the digital information source. The source rate is preferably calculated in units of information packets per second and may be an arbitrary user defined rate such as, for example, 15 or 24 information packets per second. Means 115 is provided for determining a counter increment. In a preferred embodiment, the counter increment is determined by dividing the source rate by the synchronization rate associated with the receiving device. The synchronization rate is preferably expressed in units of synchronization events per second, where a synchronization event corresponds to the completed processing of an information packet by the receiving device. In the preferred embodiment shown in FIG. 2, where the receiving device is a display monitor, each vertical blanking interval of the monitor corresponds to a synchronization event. In a further embodiment, a computer generated event flag may be used to signal a synchronization event.

Means 120 is provided for selecting a current information packet from said sequence of digital information packets, and means 125 is provided for selecting a next information packet from said sequence of digital information packets. Means 130 is provided for receiving into the receiving device the current information packet selected by means 120. Means 135 is provided for initializing a counter. In a preferred embodiment, the counter is initialized to a value of 1.0, although other values may be used.

Means 140 is provided for detecting the occurrence of a synchronization event on the receiving device. Upon the occurrence of a synchronization event, means 145 decrements the counter by the counter increment and means 150 compares the counter to a predetermined threshold T. If the counter is less than or equal to T, then means 155 receives the next selected information packet into the receiving device, means 165 selects a next information packet from said sequence of digital information packets and means 170 increments the counter by a constant K. Means 180 is provided for detecting whether all the information packets in the sequence have been received into the receiving device. If the end of the sequence has not been reached, the process is repeated from means 140.

Figure 2:
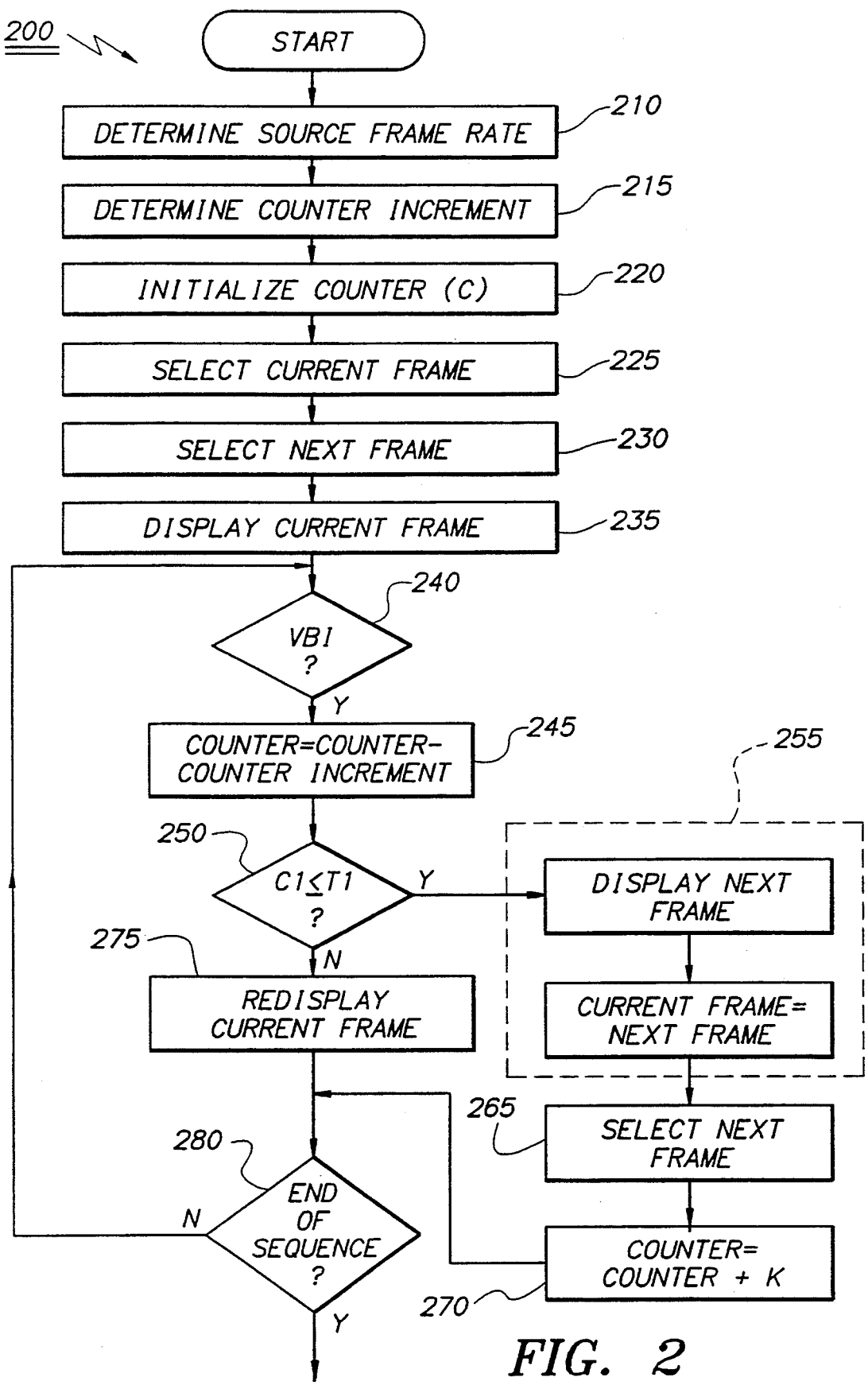
FIG. 2 is a flow diagram illustrating the operation of a system for synchronizing a sequence of digital video frames according to a preferred embodiment of the present invention.

Referring now to FIG. 2, there is shown a flow diagram illustrating the operation of a system 200 for synchronizing a sequence of two or more digital video frames that are provided from a digital video source (not shown) and later displayed on a physical monitor (not shown). The digital video source may consist of an optical disc player, a digitizer, a network or any other suitable device. The physical monitor may be a VGA or XGA monitor, or alternatively, a monitor which functions in accordance with the NTSC or PAL systems.

Means 210 are provided for determining a source frame rate associated with the digital video source. The source frame rate is preferably calculated in units of frames per second and may be an arbitrary user defined frame rate such as, for example, 15 or 24 FPS. Alternatively, the source frame rate may be the frame rate associated with NTSC or PAL systems. Means 215 are provided for determining a counter increment. In a preferred embodiment, the counter increment is determined by dividing the source frame rate by the vertical blanking interval rate ("VBI rate") associated with the physical monitor. The VBI rate is preferably a value which may be expressed in units of VBI's per second and the counter increment is preferably a value which may be expressed in units of FPS/VBI rate. Means 220 are provided for initializing a counter. In a preferred embodiment, the counter is initialized to a value of 1.0, although other values may be used. Means 225 is provided for selecting a current frame for display from said sequence of digital video frames, and means 230 is provided for selecting a next frame for display from said sequence of digital video frames. Means 235 displays the current frame selected by means 225 on the monitor.

Means 240 is provided for detecting the occurrence of a VBI on the monitor. Upon the occurrence of a VBI, means 245 decrements the counter by the counter increment and means 250 compares the counter to a predetermined threshold T. If the counter is less than or equal to T, then means 255 displays the next selected frame on the monitor by setting the current frame for display equal to the next frame for display, means 265 selects a next frame for display from said sequence of digital video frames and means 270 increments the counter by a constant K. If the counter is not less than or equal to T, then means 275 redisplays the current frame on the monitor. Means 280 is provided for detecting whether all the frames in the sequence have been displayed on the monitor. If the end of the sequence has not been reached, the process is repeated from means 240.

The aspect of present invention directed to the synchronizing of a sequence of two or more digital video frames has been implemented using an Intel model 82750PB processor. For purposes of the embodiments shown in FIGS. 1 and 2, suitable values for T and K are 0 and 1.0, respectively, although other values may be used.

Figure 3:
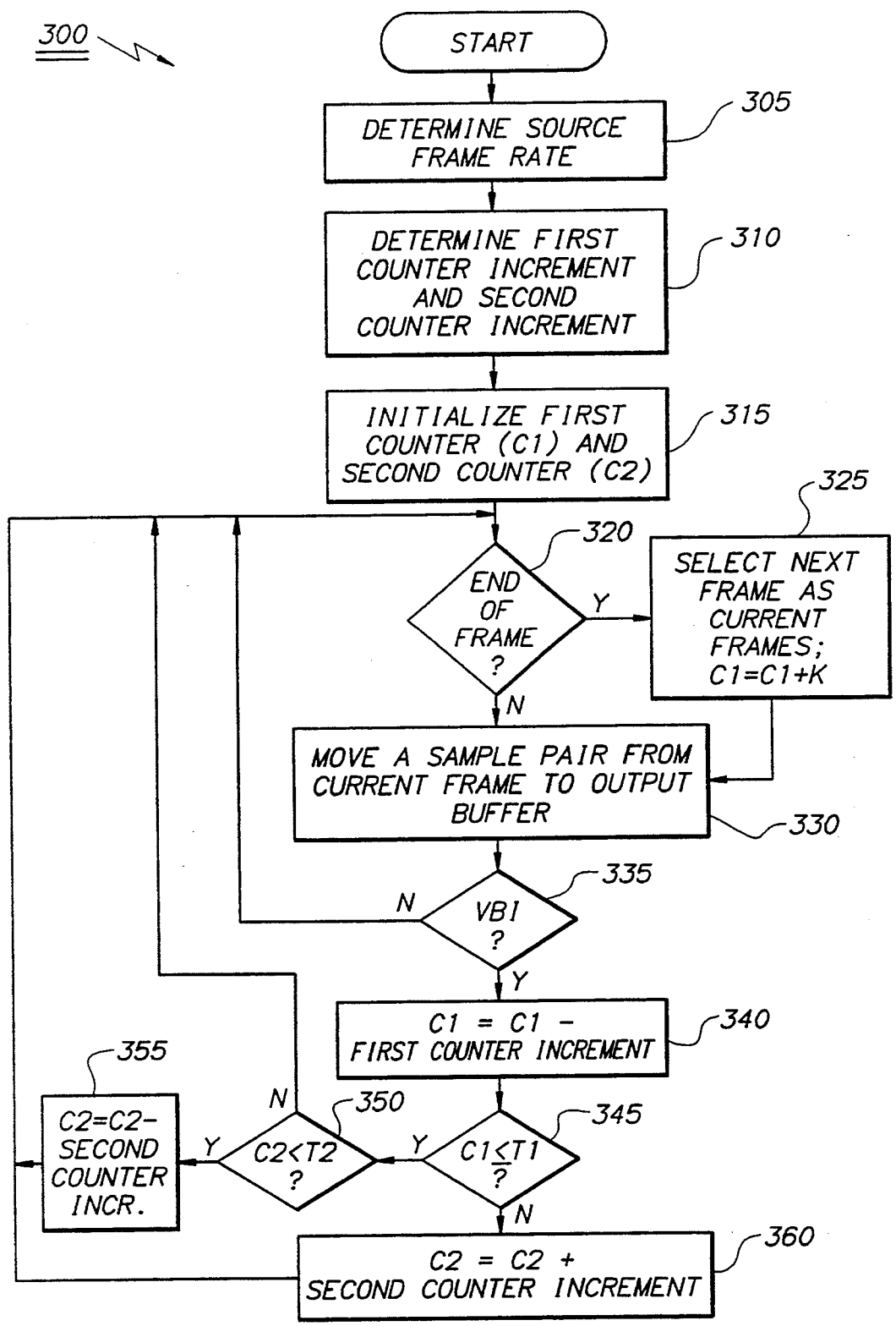
FIG. 3 is a flow diagram illustrating the operation of a system for synchronizing a sequence of digital audio frames according to a preferred embodiment of the present invention.

Referring now to FIG. 3, there is shown a flow diagram illustrating the operation of a system 300 for synchronizing a sequence of two or more digital audio frames that are provided from a digital audio source (not shown) and later played on a digital audio player (not shown). The digital audio source may consist of an optical disc player, a digitizer, a network or any other suitable device. The digital audio player produces an analog audio signal by sampling digital audio information provided by the digital audio source.

In the preferred embodiment shown in FIG. 3, a sequence of digital audio frames is synchronized to the digital audio player by monitoring the display rate of an associated sequence of corresponding digital video frames. Means 305 are provided for determining a source frame rate associated with the digital video source. The source frame rate is preferably calculated in units of frames per second and may be an arbitrary user defined frame rate such as, for example, 15 or 24 FPS. Alternatively, the source frame rate may be the frame rate associated with NTSC or PAL systems. Means 310 is provided for determining a first counter increment used for synchronizing the associated sequence of digital video frames to a physical monitor (not shown). The first counter increment is preferably determined by dividing the source frame rate by the VBI rate associated with the physical monitor. Means 310 also determines a second counter increment used for synchronizing the sequence of digital audio frames to the digital audio player. In a preferred embodiment, the second counter increment is determined to be a constant. Means 315 is provided for initializing a first counter (C1) and a second counter (C2). In a preferred embodiment, the first and second counters are initialized to the values 1.0 and 0, respectively, although other values may be used.

Means 320 is provided for determining whether the end of a current audio frame has been reached by the audio player. If the end of the current frame has been reached, then means 325 selects a next audio frame from the sequence of audio frames as the current frame. Means 325 also increments the first counter by a constant K. Means 330 is provided for moving a pair of digital audio samples from the current frame to an output buffer. As will be described in connection with FIG. 4 below, means 330 moves either a next pair or a previous pair of digital audio samples from the current frame to the output buffer depending on the state of a totalizer.

Means 335 is provided for determining whether a VBI has occurred on the monitor. If a VBI has occurred, means 340 decrements C1 by the first counter increment and means 345 compares the first counter to a first predetermined threshold (T1). If the first counter is less than or equal to T1, then means 350 compares the second counter to a second predetermined threshold (T2). If C2 is greater than T2, then means 355 decrements C2 by the second counter increment. If the first counter is not less than or equal to T1, then means 360 increments C2 by the second counter increment. The process is repeated from means 320 until each frame in the sequence of digital audio frames has been processed. Suitable values for T1, T2 and K are 0, 0 and 1.0, respectively, although other values may be used.

Figure 4:
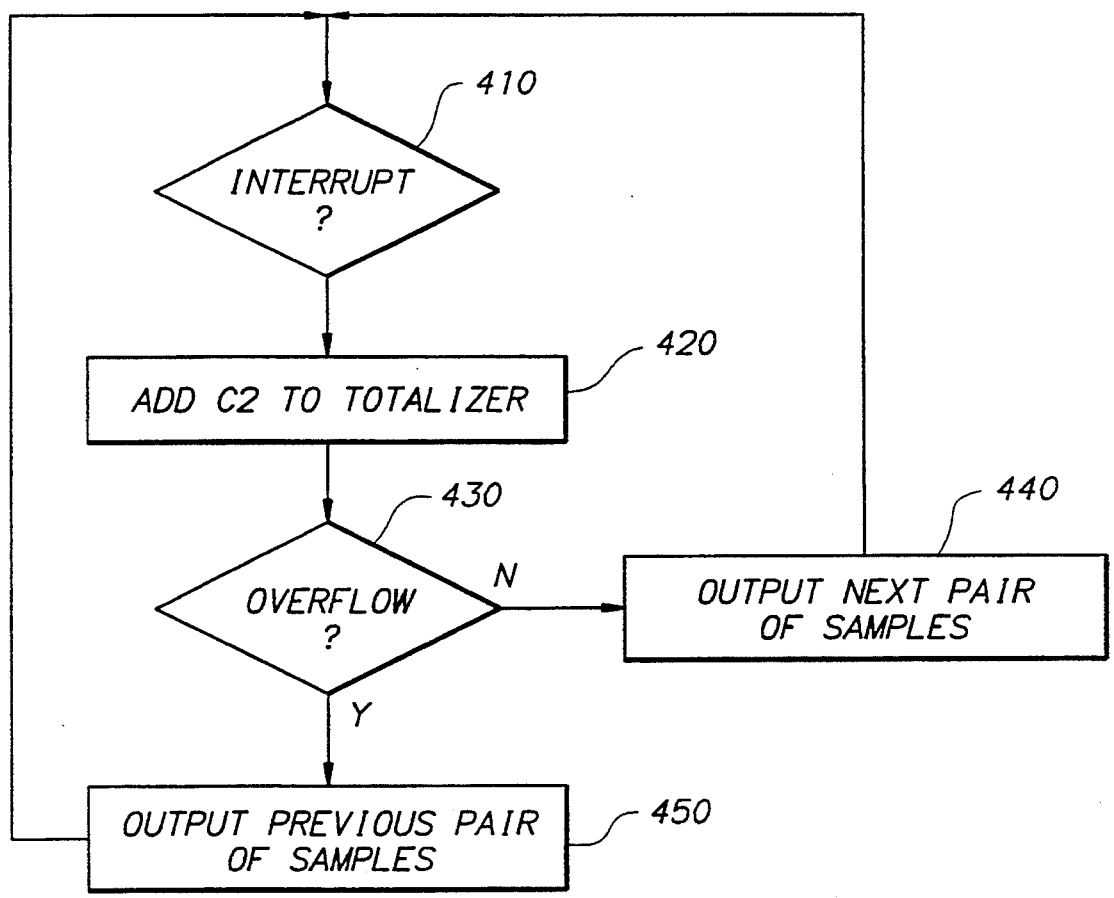
FIG. 4 is a flow diagram showing the operation of the temporal dithering method used to synchronize digital audio frames in accordance with a preferred embodiment of the present invention.

Means 330 temporally dithers the playing time of the current audio frame by selectively duplicating pairs of samples from the frame. FIG. 4 is a flow diagram showing the operation of the temporal dithering method used by means 330. Means 410 is provided for monitoring interrupts generated by a processor. When the present invention is implemented on an Analog Devices model ADS 2105 processor, these interrupts are generated at the rate of 44,100 per second. Upon each interrupt, means 420 adds the current value of C2 to a totalizer. Means 430 is provided for determining whether the totalizer has overflowed as a result of having been incremented by means 420. If an overflow condition is not detected, means 440 outputs the next pair of samples from the current digital audio frame. If an overflow condition is detected, means 450 outputs the previous pair of samples from the current digital audio frame. In the preferred embodiment, the totalizer is formed from a sixteen bit word and the second counter increment (used to increment C2) is set at a constant value of 16.

The present invention may be embodied in other specific forms without departing from the spirit or essential attributes of the invention. Accordingly, reference should be made to the appended claims, rather than the foregoing specification, as indicating the scope of the invention.

What is claimed is:

1. A method for synchronizing a sequence of digital video frames provided from a digital video source at a source frame rate, said sequence of digital video frames being displayed on a monitor having an associated vertical blanking interval rate, comprising the steps of:
   (A) determining a counter increment;
   (B) selecting a current frame for display from said sequence;
   (C) selecting a next frame for display from said sequence;
   (D) displaying said current frame on said monitor;
   (E) upon an occurrence of a vertical blanking interval on said monitor:
      (i) subtracting said counter increment from a counter;
      (ii) comparing said counter to a predetermined threshold;
      (iii) if said counter is less than or equal to said predetermined threshold, then
         (a) displaying said next frame on said monitor by setting said current frame for display equal to said next frame for display;
         (b) selecting a next frame from said sequence for display;
         (c) adding a predetermined constant to said counter; otherwise
         redisplaying said current frame on said monitor; and (F) repeating step (E) upon the occurrence of each subsequent vertical blanking interval of said monitor until each frame in said sequence has been displayed.

2. The method of claim 1, wherein step (A) comprises dividing said source frame rate by said associated vertical blanking interval rate to determine said counter increment.

3. The method of claim 1, wherein step (A) further comprises the step of initializing said counter.

4. An apparatus for displaying a sequence of digital video frames provided from a digital video source at a source frame rate, said sequence of digital video frames being displayed on a monitor having an associated vertical blanking interval rate, comprising,:

(A) means for determining a counter increment;
(B) means for selecting a current frame for display from said sequence;
(C) means for selecting a next frame for display from said sequence;
(D) means for displaying said current frame on said monitor;
(E) means for subtracting said counter increment from a counter upon an occurrence of a vertical blanking interval on said monitor;
(F) means for comparing said counter to a predetermined threshold upon said occurrence of said vertical blanking interval on said monitor;
(G) means for displaying said next frame on said monitor by setting said current frame for display equal to said next frame for display if said counter is less than or equal to said predetermined threshold;
(H) means for selecting a next frame from said sequence for display if said counter is less than or equal to said predetermined threshold;
(I) means for adding a predetermined constant to said counter if said counter is less than or equal to said predetermined threshold;
(J) means for redisplaying said current frame on said monitor if said counter is not less than or equal to said predetermined threshold.

5. The apparatus of claim 4, wherein said means for determining a counter increment comprises means for dividing said source frame rate by said associated vertical blanking interval rate to determine said counter increment.

6. The apparatus of claim 4, further comprising means for initializing said counter.

* * * * *

UNITED STATES PATENT AND TRADEMARK OFFICE
CERTIFICATE OF CORRECTION

PATENT NO. : 5,404,171
DATED : April 4, 1995
INVENTOR(S) : Judith A. Goldstein, et. al.

It is certified that error appears in the above-indentified patent and that said Letters Patent is hereby corrected as shown below:

Title page, item [75], inventor: line 4, delete "J." and insert therefore --L.--.

Signed and Sealed this

First Day of August, 1995

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,404,171

DATED : April 4, 1995

INVENTOR(S) : Judith A. Goldstein, Kenneth Mills, Michael J. Keith and James L. Jeffers It is certified that error appears in the above-indentified patent and that said Letters Patent is hereby corrected as shown below:

Title page, left column, line 2, delete "Golstein" and insert therefor --Goldstein--.

Title page, left column, line 6, delete "Golstein" and insert therefor --Goldstein--.

Signed and Sealed this

Twenty-third Day of January, 1996

Attest:

BRUCE LEHMAN

Attesting Officer     Commissioner of Patents and Trademarks